(12) United States Patent
Cho

(10) Patent No.: US 6,185,690 B1
(45) Date of Patent: Feb. 6, 2001

(54) PORTABLE COMPUTER HAVING A RADIO FUNCTION AND RELATED METHOD

(75) Inventor: Jong-Il Cho, Suwon (KR)

(73) Assignee: Samsung Electronics Co., Ltd., Suwon (KR)

(*) Notice: Under 35 U.S.C. 154(b), the term of this patent shall be extended for 0 days.

(21) Appl. No.: 09/124,028

(22) Filed: Jul. 29, 1998

(30) Foreign Application Priority Data

Jul. 30, 1997 (KR) .................................................. 97-36032

(51) Int. Cl.[7] .................................................. G06F 1/26
(52) U.S. Cl. .................................................. 713/300
(58) Field of Search .................................. 713/300–340

(56) References Cited

U.S. PATENT DOCUMENTS

| 4,545,071 | 10/1985 | Freeburg | 455/422 |
| 5,302,947 | 4/1994 | Fuller et al. | 340/825.34 |
| 5,353,334 | 10/1994 | O'Sullivan | 455/557 |
| 5,418,524 | 5/1995 | Fennell | 340/825.22 |
| 5,459,458 | 10/1995 | Richardson et al. | 340/825.52 |
| 5,604,928 | 2/1997 | Hamano et al. | 455/310 |
| 5,628,055 | 5/1997 | Stein | 455/575 |
| 5,638,540 | 6/1997 | Aldous | 713/300 |
| 5,708,833 | 1/1998 | Kinney et al. | 710/102 |

Primary Examiner—Sumati Lefkowitz
(74) Attorney, Agent, or Firm—Robert E. Bushnell, Esq.

(57) ABSTRACT

A portable computer has a radio function implemented by a radio set included therein. The portable computer also has a switch for selecting main power for the entire system or a radio power for the a radio set, a micro-controller for outputting a power supply selecting signal and a sound source selecting signal according to the operational state of the switch unit, a power branching unit for branching and outputting power into main power to operate the portable computer or into radio power to play the radio set according to the power supply selecting signal outputted from the micro-controller, and a sound source selecting unit for selecting and outputting a signal from the radio set or a signal from the portable computer according to the sound source selecting signal received from the micro-controller.

16 Claims, 6 Drawing Sheets

PORTABLE COMPUTER HAVING A RADIO FUNCTION AND RELATED METHOD

CLAIM OF PRIORITY

This application makes reference to, incorporates the same herein, and claims all benefits accruing under 35 U.S.C. §119 from an application for *A PORTABLE COMPUTER HAVING A RADIO FUNCTION* earlier filed in the Korean Industrial Property Office on the Jul. 30, 1997 and there duly assigned Ser. No. 36032/1997.

BACKGROUND OF THE INVENTION

1. Technical Field

The present invention relates to a portable computer having a radio function and a related method, and, more particularly, to a portable computer which enables a user to listen to the radio without use of an additional radio set or cassette recorder capable of receiving a radio signal.

2. Related Art

Typically, a personal computer includes a central processing unit (CPU), a system bus, a random access memory (RAM), a read-only memory (ROM), an audio card, a speaker, a micro-controller and a power supply. Furthermore, with respect to the typical personal computer, if the user needs a radio set or cassette recorder capable of receiving a radio signal in order to listen the radio, the user must acquire the additional radio set or cassette recorder in order to have the capability of receiving a radio signal or other external audio signal. This is an inconvenience to the user.

The further problem arises when it is necessary for the user to transport the portable computer. In that case, the user has the further inconvenience of transporting the additional radio set or cassette recorder.

The following patents are considered to be representative of the prior art, and are burdened by the disadvantages set forth herein: U.S. Pat. No. 4,545,071 to Freeburg, entitled *Portable Radio For A zoned Data Communicating Message Signals Between Portable Radios And A Host Computer*, U.S. Pat. No. 5,302,947 to Fuller et al., entitled *Method And Apparatus For Loading A Software Program From A Radio Modem Into An External Computer*, U.S. Pat. No. 5,353,334 to O'Sullivan, entitled *Interface For Connecting Computers To Radio Telephone Networks*, U.S. Pat. No. 5,418,524 to Fennell, entitled *Method And Apparatus For Over-The-Air Upgrading Of Radio Modem Application Software* U.S. Pat. No. 5,459,458 to Richardson et al., entitled *Virtual Pager For General Purpose Data Terminal,* U.S. Pat. No. 5,604,928 to Hamano et al., entitled *Portable Electronic Device With Radio Communication And Controlled Computer Status,* U.S. Pat. No. 5,628,055 to Stein, entitled *Modular Radio Communications System,* U.S. Pat. No. 5,638,540 to Aldous, entitled *Portable Computer/Radio Power Management System,* and U.S. Pat. No. 5,708,833 to Kinney et al., entitled *Antenna Cap, Antenna Connectors And Telephone Line Connectors For Computer Devices Utilizing Radio And Modem Cards.*

Some of the system disclosed in the above patents have radio capability. For example, Aldous '540 discloses a portable computer/radio power management system. Other patents (for example, Hamano et al. '928 and Richardson et al. '458) employ radio transmitter/receiver elements to provide communication between a computer and external entities. However, none of the patents cited above discloses or suggests a portable computer having a radio function and related method comprising the combination of functions and/or steps disclosed and claimed herein.

SUMMARY OF THE INVENTION

It is an object of the present invention to provide a portable computer having a radio function and a related method which enables a user to listen to the radio without use of an additional radio set or cassette recorder capable of receiving a radio signal.

To achieve the above object and in accordance with the purpose of the invention, the portable computer, which has a CPU, RAM, ROM, audio card and a radio set therein, comprises a switch unit, a micro-controller, a power branching unit, a sound source selecting unit and a sound source altering switch.

The switch unit selects main power for operating an entire system and radio power for playing a radio set.

The micro-controller outputs a power supply selecting signal and a sound source selecting signal according to an operational state of the switch unit.

The power branching unit branches and outputs power into main power or radio power according to the power supply selecting signal from the micro-controller.

The sound source selecting unit selects and outputs a signal from the radio set or a signal from the computer system according to the sound source selecting signal from the micro-controller.

The present invention further comprises a sound source alteration switch. The sound source alteration switch, connected to the sound source selecting unit, outputs a sound source altering signal to alter a voice signal outputted from the sound source selecting unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Preferred embodiments of the present invention will become apparent from a study of the following detailed description with reference to the accompanying drawings.

Figure 6:
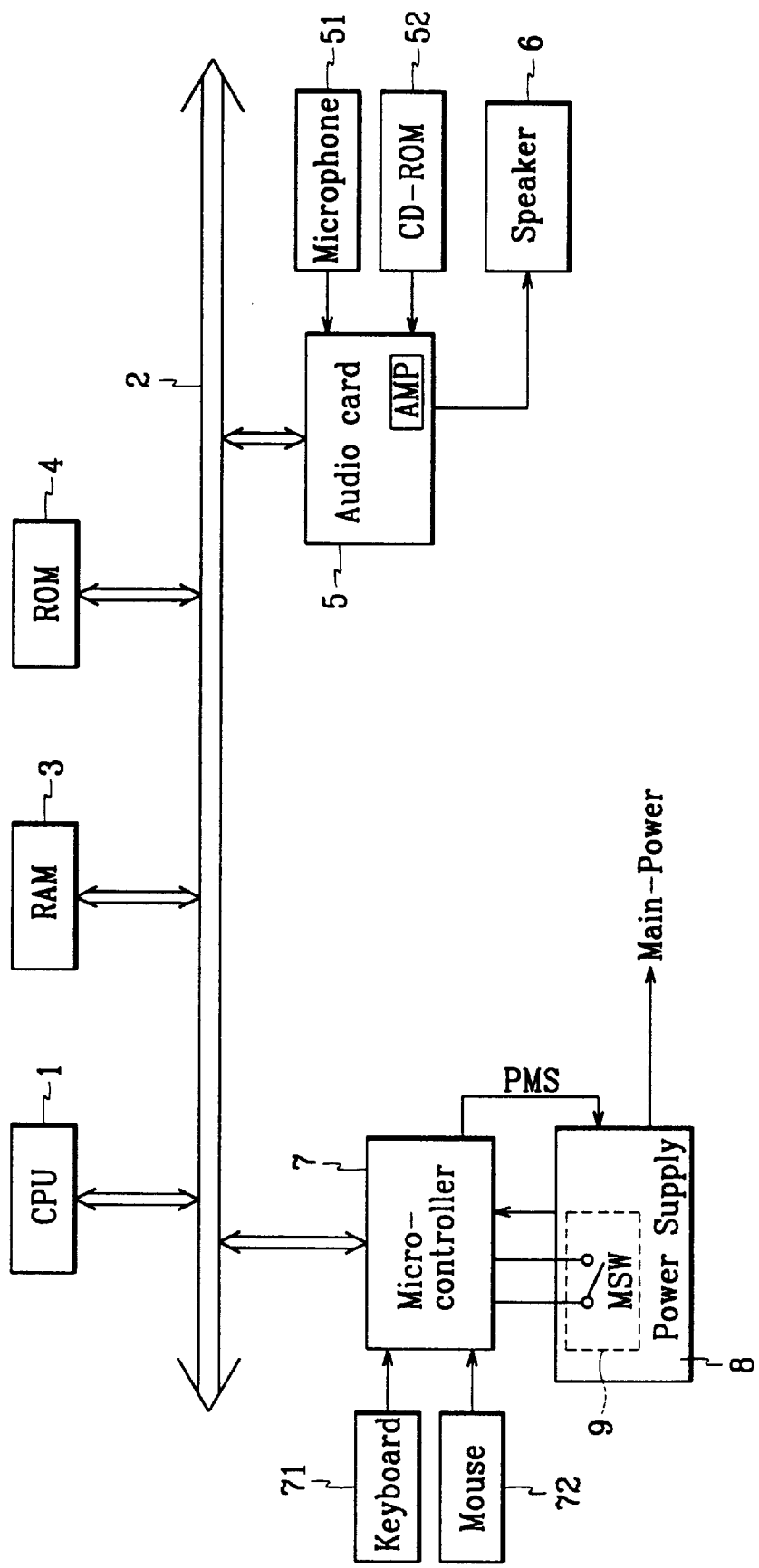
FIG. 6 is a block diagram of a portable computer.

FIG. 6 is a schematic diagram of a portable computer. As shown in FIG. 6, the personal computer includes a central processing unit (CPU) 1, a system bus 2, a random-access-memory (RAM) 3, a read-only-memory (ROM) 4, an audio card 5, a speaker 6, a micro-controller 7, and a power supply 8. The system bus 2 interfaces data, commands and interrupt signals among the various devices of the computer system. The RAM 3, connected to the system bus 2, provides a storage facility wherein the CPU 1 loads system software and user software. The ROM 4, connected to the system bus 2, stores the specific programs to be executed by the CPU 1 therein. The audio card 5, connected to the system bus 2, receives a signal outputted from a microphone 51 and a compact disk read only memory (CD-ROM) drive 52, and amplifies the signal into an output enable voice signal. The speaker 6 outputs the voice signal outputted from the audio card 5 so that the user can hear the sound. The micro controller 7, connected to the system bus 2, outputs a power management system(PMS) control signal according to a control signal outputted from a keyboard 71 or a mouse 72.

The power supply 8 supplies main power to the entire system according to the PMS-control signal, or when the main power switch (MSW) 9 is turned ON. Using the latter personal computer, a user needs an additional radio set or cassette recorder capable of receiving a radio signal in order to listen to the radio. Furthermore, when transporting the portable computer, the user has an inconvenience in that the additional radio set or the cassette recorder capable of receiving a radio signal must be transported as well.

Figure 1:
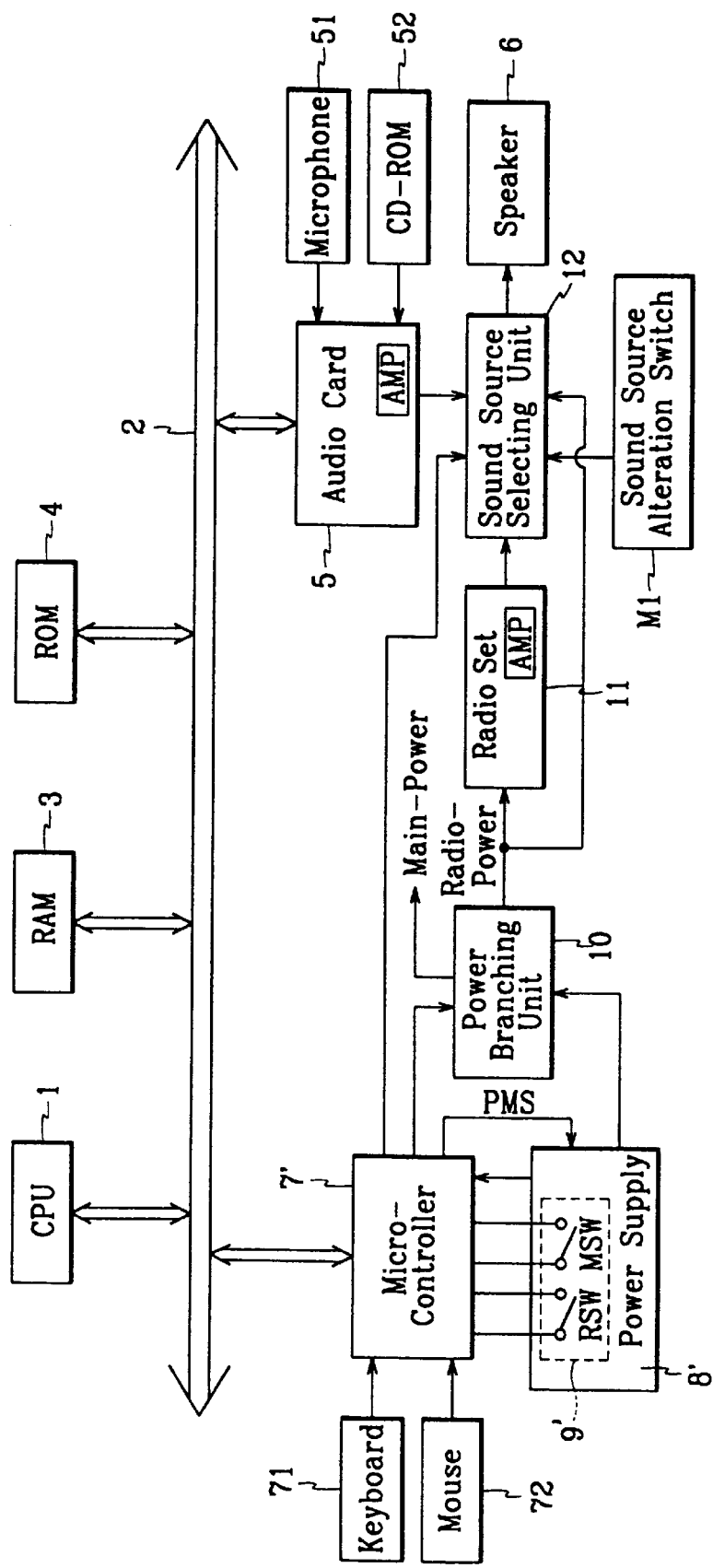
FIG. 1 is a block diagram of a computer system having a radio function according to the present invention.

Referring now to FIG. 1, a portable computer has a CPU 1, RAM 3, ROM 4, audio card 5 and a radio set 11. In accordance with the embodiment of the present invention, the portable computer also comprises a micro-controller 7', a power supply 8' including a switch unit 9', a power branching unit 10, a sound source selecting unit 12, and a sound source altering switch M1. The switch unit 9 selects main power for operating the entire system or radio power for playing the radio set 11. The power supply 8' supplies power to a corresponding device according to the operating state of the switch unit 9' or a PMS control signal. The micro-controller 7, powered by the power supply 8', outputs the PMS control signal to the power supply 8' according to a control signal outputted from a keyboard 71 or a mouse 72. According to the operational state of the switch 9', the micro-controller 7 outputs a main power supply signal and a main sound source selecting signal, or outputs a radio power supply signal and a radio sound source selecting signal.

The power branching unit 10 outputs the power provided from the power supply 8' as main power to the entire system when receiving the main power supply signal, or outputs the power as radio power for playing the radio set when receiving the radio power supply signal. The radio set 11, powered by the radio power, receives a radio signal transmitted from the outside, converts it, and amplifies it to provide a first voice signal. When receiving the radio sound source selecting signal, the sound source selecting unit 12 selects the first voice signal as the sound source, and outputs it to the speaker 6. When receiving the main sound source selecting signal, the sound source selecting unit 12 selects a second voice signal outputted from the audio card 5 as the sound source, and outputs it to the speaker 6. When receiving a sound source altering signal, the sound source selecting unit 12 alters the voice signal to be outputted to the speaker 6 to form another voice signal, and outputs the altered voice signal.

The sound source altering switch M1, connected to the sound source selecting unit 12, outputs a sound source altering signal to alter the sound source to be outputted from the sound source selecting unit 12. The switch unit 9' includes a main power switch MSW and a radio power switch RSW. The main power switch MSW selects main power for operating the entire system. The radio power switch RSW selects radio power for playing the radio set 11. The radio set 11 includes an amplifier AMP for amplifying the radio signal received from the outside to an output enable level.

Hereinafter, the operation of a portable computer having a radio function in accordance with the embodiment of the present invention will be explained according to the operating state of the switch unit. First, the case wherein the radio power switch RSW is turned ON is explained with reference to FIG. 3. When a user turns ON the radio power switch RSW of the switch unit 9' to listen to the radio, the power supply 8' supplies power to the micro-controller 7' and the power branching unit 10.

When, the micro-controller 7' senses that the radio power switch RSW is turned ON at step S301 of determining the operational state of the switch unit 9, outputs radio power supply signal to provide a radio power to the power branching unit 10, and outputs the radio sound source selecting signal to the sound source selecting unit 12 in order to select the first voice signal outputted from the radio set 11 as the sound source. Then, the power branching unit 10 outputs power provided from the power supply 8' as the radio power according to the input of the radio power supply signal (Step S303).

The radio set 11, powered by the radio power, receives a radio signal from the outside, converts the radio signal to the first voice signal, amplifies the first voice signal in amplifier AMP to the output enable level, and outputs it to the sound source selecting unit 12. The sound source selecting unit 12, powered by the radio power, selects the first voice signal outputted from the radio set 11 as the sound source according to the input of the radio sound source selecting signal, and outputs it to the speaker 6 (Step S305).

Figure 3:
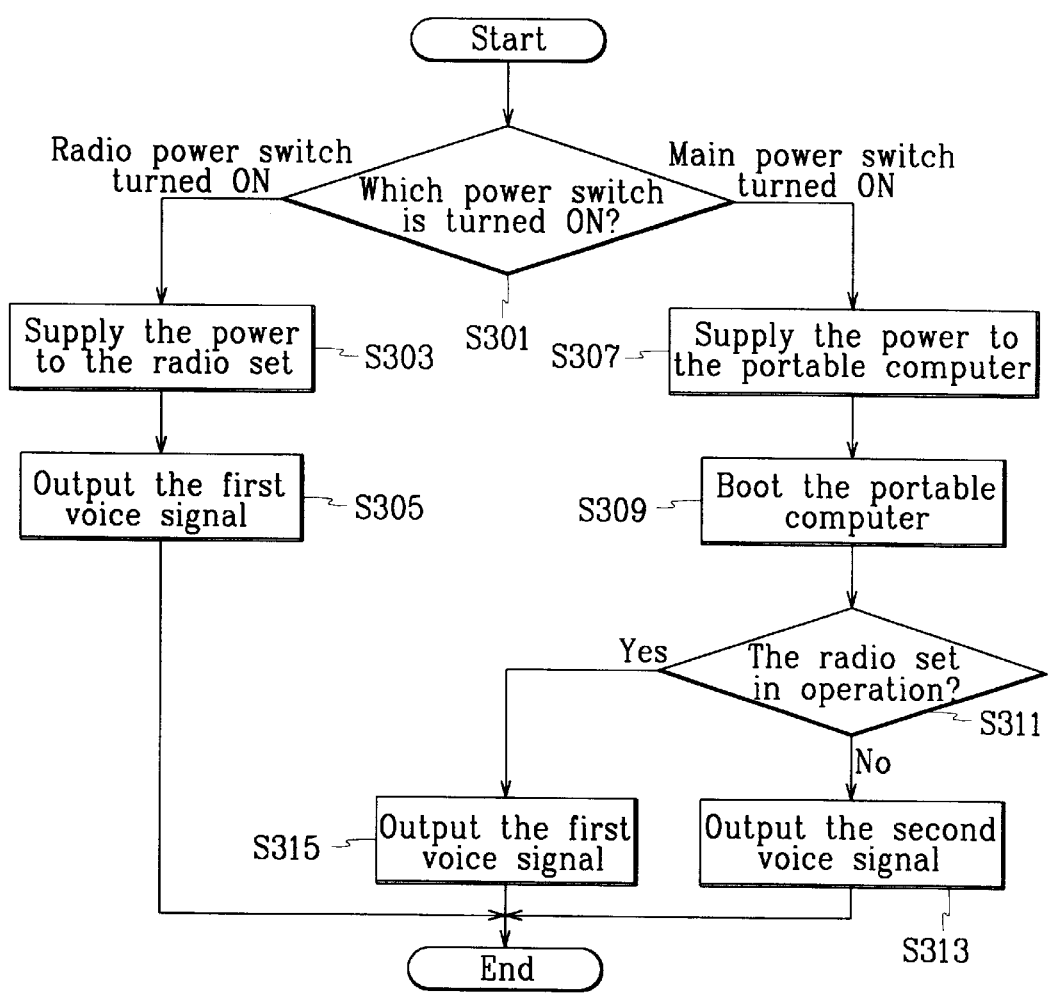
FIG. 3 is a flow chart showing the operation of the portable computer having a radio function when the switch unit is turned ON according to the present invention.

Second, the case wherein the main power switch MSW is turned ON will be explained with reference to FIG. 3. When the user turns ON the main power switch MSW of the switch unit 9', the power supply 8' supplies power to the micro-controller 7' and the power branching unit 10.

When the micro-controller 7' senses that the main power switch MSW is turned ON at step S301 of determining the operational state of the switch unit 9, it outputs the main power supply signal to provide main power to the power branching unit 10. Then, the power branching unit 10 outputs the power provided from the power supply 8' as main power according to the input of the main power supply signal (step S307). When the main power is supplied, the computer system is booted (step S309). After the booting is finished, the micro-controller 7' determines whether the radio set 11 is in operation (step S311). As a result of step S311, if the radio set 11 is not in operation, the micro-controller 7' outputs the main sound source selecting signal to the sound source selecting unit 12 in order to select the second voice signal outputted from the audio card 5 as the sound source. The sound source selecting unit 12 selects the second voice signal outputted from the audio card 5 as the sound source according to the input of the main sound source selecting signal, and outputs it to the speaker 6 (step S313).

The audio card 5 converts the signal outputted from the microphone 51 and CD-ROM 52 to a voice signal, and amplifies the voice signal in built-in amplifier AMP to an output enable level. This voice signal constitutes the second voice signal. On the other hand, as a result of step S311, if the radio set 11 is in operation, the micro-controller 7' outputs the radio sound source selecting signal to sound source selecting unit 12 in order to select the first voice signal outputted from the radio set 11 as the sound source. The sound source selecting unit 12 selects the first voice signal outputted from the radio set 11 as the sound source according to the input of the radio sound source selecting signal, and outputs it to the speaker 6 (step S315).

Figure 4:
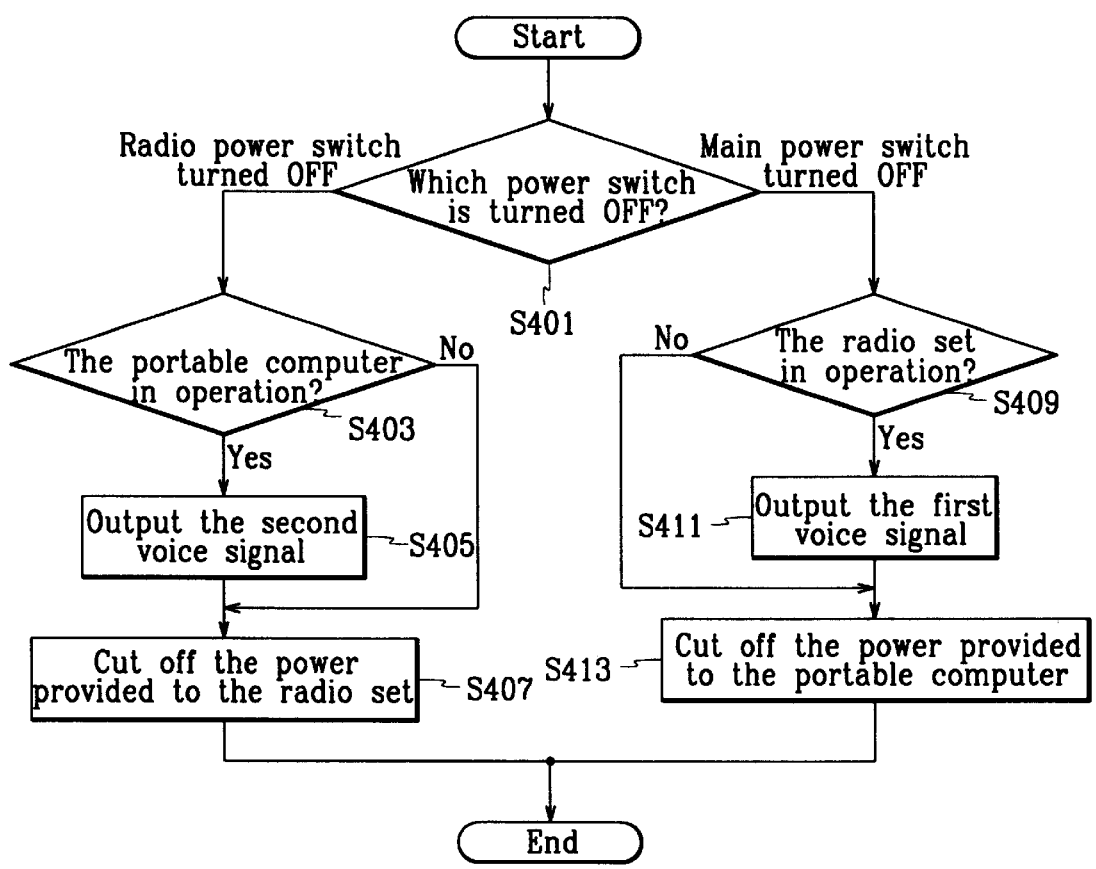
FIG. 4 is a flow chart showing the operation of the portable computer having a radio function when the switch unit is turned OFF according to the present invention.

Third, the case wherein the radio power switch RSW is turned OFF is explained with reference to FIG. 4. When the radio power switch RSW is turned OFF, the micro-controller 7' senses that the radio power switch RSW is turned OFF at step S401 of determining the operational state of the switch unit 9, and determines whether the computer system is in operation (step S403). As a result of step S403, if the computer system is in operation, the micro-controller 7' outputs the main sound source selecting signal to the sound source selecting unit 12, and outputs a signal to the power branching unit 10 in order to cut off the radio power provided to the radio set 11. Then, the sound source selecting unit 12 selects the second voice signal outputted from the audio card 5 as the sound source, and outputs it to the speaker 6 (step S405). The power branching unit 10 cuts off the power provided to the radio set 11 (step S407). On the other hand, as a result of step S403, if the computer system is not in operation, the micro-controller 7' outputs a signal to the power branching unit 10 to cut off the radio power provided to the radio set 11 without executing step S405 of selecting the sound source, so that the power provided to the radio set 11 is cut off.

Fourth, the case that the main power switch is turned OFF is explained with reference to FIG. 4. When the main power switch MSW is turned OFF, the micro-controller 7' senses that the main power switch MSW is turned OFF at step S401 of determining the state of the switch unit 9, and determines whether the radio set 11 is in operation (step S409). As a result of step S409, if the radio set is in operation, the micro-controller 7' outputs the radio sound source selecting signal to the sound source selecting unit 12, and outputs a signal to the power branching unit 10 in order to cut off the main power provided to the computer system. Then, the sound source selecting unit 12 selects the first voice signal outputted from the radio set 11 as the sound source, and outputs it to the speaker 6 (step S411). The power branching unit 10 cuts off the main power provided to the computer system (step S413). On the other hand, as a result of step 409, if the radio set 11 is not in operation, the micro-controller 7' outputs a signal to the power branching unit 10 cut off the main power provided to the computer system without executing step S411 of selecting the sound source, so that the power supplied to the computer system is cut off (step S413).

Figure 2:
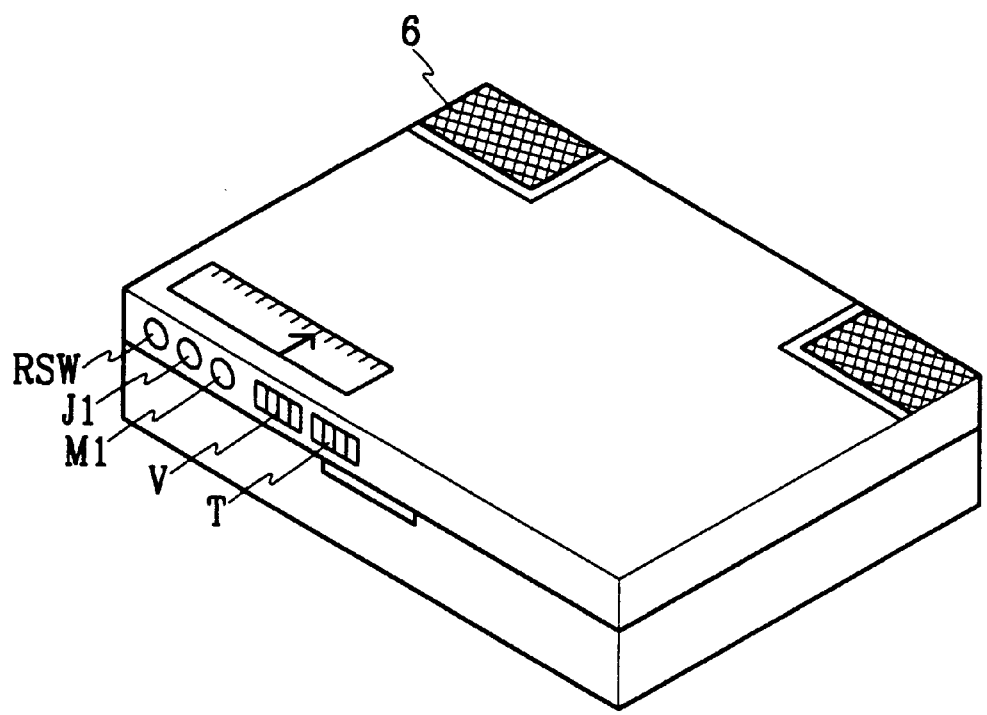
FIG. 2 is a perspective view of a portable computer having a radio function according to the present invention.
Figure 5:
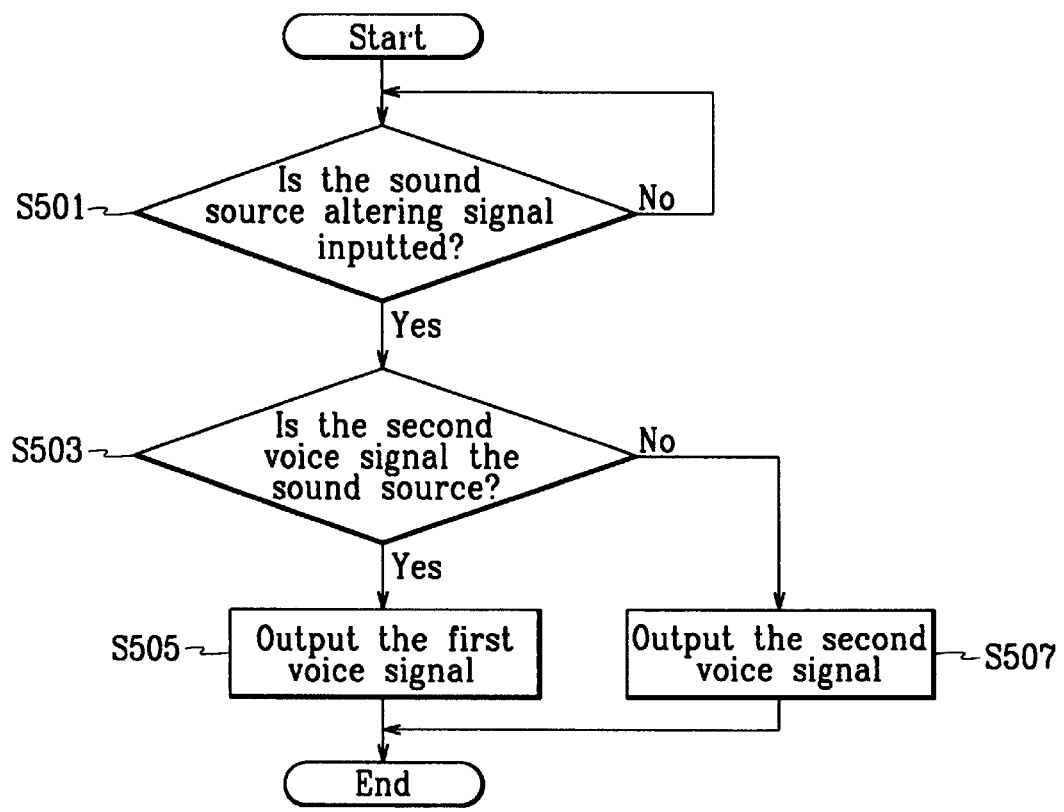
FIG. 5 is a flow chart showing the operation of the portable computer having a radio function when altering the sound source according to the present invention.

Fifth, the case that both the main power switch MSW and the radio power switch RSW are turned ON is explained with reference to FIG. 5. When the main power switch MSW and the radio power switch RSW are turned ON so that both the computer system and the radio set 11 are in operation, the sound source altering signal is outputted to the sound source selecting unit 12 if the sound source altering switch M1 as shown in FIG. 2 and FIG. 3 is pressed. The sound source selecting unit 12 senses the sound source altering signal at step S501 of determining whether the sound source altering signal is inputted, and determines whether the present sound source is the second voice signal outputted from the audio card 5 (step S503). According to a result of step S503, if the second voice signal outputted from the audio card 5 is the sound source, the sound source selecting unit 12 alters the first voice signal outputted from the radio set 11 to the sound source, and outputs it to the speaker 6 (step S505). On the other hand, if the first voice signal outputted from the radio set 11 is the sound source, the sound source selecting unit 12 alters the second voice signal outputted from the audio card 5 to the sound source, and outputs it to the speaker 6 (step S507).

Referring to FIG. 2, when the radio set 11 is in operation, the user can adjust the sound volume using the volume adjuster V and change the frequency using the tuner T.

As described above, the portable computer having a radio function enables the user to listen to the radio without an additional radio set or cassette recorder capable of receiving a radio signal. Therefore, the user is not bothered by having to carry an additional radio set or cassette recorder capable of receiving a radio signal when moving with the portable computer.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A portable computer having a radio function provided by a radio set included therein, said portable computer comprising:
    micro-controller means for outputting a power supply selecting signal and a sound source selecting signal according to an operational state selected by a user;
    power branching means for branching and outputting power selectively into the main power to operate the portable computer and into the radio power to play the radio set according to the power supply selecting signal outputted from the micro-controller means; and
    sound source selecting means for selectively outputting a signal from the radio set and a signal from the portable computer according to the sound source selecting signal outputted from the micro-controller means.

2. The portable computer of claim 1, wherein the micro-controller means selectively outputs a main power supply signal and a main sound source selecting signal, on the one hand, and outputs a radio power supply signal and a radio sound source selecting signal, on the other hand, according to the operational state selected by the user.

3. The portable computer of claim 1, further comprising:
    sound source alteration switch means, connected to the sound source selecting means, for outputting a sound source altering signal to alter a voice signal outputted from the sound source selecting means to provide another voice signal.

4. The portable computer of claim 1, wherein the sound source selecting means selects a first voice signal as the sound source and outputs it upon receiving a second voice signal, and selects a second voice signal as the sound source and outputs it upon receiving a first voice signal, according to the sound source altering signal received from the sound source alteration switch means.

5. The portable computer of claim 1, further comprising switch means for selecting main power for said portable computer and radio power for said radio set.

6. A portable computer having a radio function provided by a radio set included therein, said portable computer comprising:
    a micro-controller means for outputting a sound source selecting signal according to an operational state selected by a user;

sound source selecting means for selectively outputting a signal from a radio set and a signal from the portable computer according to the sound selecting signal outputted from the micro-controller means; and sound source alteration switch means connected to the sound source selecting means for outputting a sound source altering signal to alter a voice signal outputted from the sound source selecting means to provide another voice signal.

7. The portable computer of claim 6, further comprising switch means for selecting main power for said portable computer and radio power for said radio set.

8. The portable computer of claim 6, wherein the micro-controller means selectively outputs a main power supply signal and a main sound source selecting signal, on the one hand, and outputs a radio power supply signal and a radio sound source selecting signal, on the other hand, according to the operational state selected by the user.

9. The portable computer of claim 6, wherein the sound source selecting means selects a first voice signal as the sound source and outputs it upon receiving a second voice signal, and selects a second voice signal as the sound source and outputs it upon receiving a first voice signal, according to the sound source altering signal received from the sound source alteration switch means.

10. A method for operating a portable computer having a radio function provided by a radio set included therein, said method comprising the steps of:

determining whether a main power switch or a radio power switch of said portable computer is turned on;

when said main power switch is turned on, supplying power to the portable computer and booting the portable computer; and when said radio power switch is turned on, supplying power to the radio set and outputting a first voice signal.

11. The method of claim 10, further comprising the steps, after booting said portable computer, of:

determining whether the radio set is in operation;

when the radio set is in operation, outputting the first voice signal; and when the radio set is not in operation, outputting a second voice signal.

12. The method of claim 10, further comprising the steps of:

determining whether a sound source altering signal is inputted;

when the sound source altering signal is inputted, determining whether a second voice signal comprises a sound source;

when the second voice signal comprises the sound source, outputting the first voice signal; and when the second voice signal does not comprise the sound source, outputting a second voice signal.

13. A method of operating a portable computer having a radio function provided by a radio set included therein, said method comprising the steps of:

determining whether a main power switch or a radio power switch of said portable computer is turned off;

when the main power switch is turned off, determining whether the radio set is in operation and, when said radio set is in operation, outputting a first voice signal; and when the radio power switch is turned off, determining whether the portable computer is in operation and, when the portable computer is in operation, outputting a second voice signal.

14. The method of claim 13, further comprising the steps of:

when the radio set is not in operation, cutting off power provided to the portable computer and, when the radio set is in operation, cutting off the power provided to the portable computer after the step of outputting the first voice signal; and when the portable computer is not in operation, cutting off power provided to the radio set and, when the portable computer is in operation, cutting off power provided to the radio set after the step of outputting the second voice signal.

15. The method of claim 13, further comprising the steps of:

determining whether a sound source altering signal is inputted;

when the sound source altering signal is inputted, determining whether a second voice signal comprises a sound source;

when the second voice signal comprises the sound source, outputting the first voice signal; and when the second voice signal does not comprise the sound source, outputting a second voice signal.

16. A method of operating a portable computer having a radio function provided by a radio set included therein, said method comprising the steps of:

determining whether a sound source altering signal is inputted;

when the sound source altering signal is not inputted, repeating the step of determining whether the sound source altering signal is inputted;

when the sound source altering signal is inputted, determining whether a second voice signal comprises a sound source;

when the second voice signal comprises the sound source, outputting a first voice signal; and when the second voice signal does not comprise the sound source, outputting a second voice signal.

* * * * *